United States Patent
Lühmann et al.

(10) Patent No.: US 6,280,840 B1
(45) Date of Patent: *Aug. 28, 2001

(54) ADHESIVE TAPE

(75) Inventors: Bernd Lühmann, Norderstedt; Andreas Junghans, Hamburg, both of (DE)

(73) Assignee: Beiersdorf AG, Hamburg (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/294,856

(22) Filed: Apr. 20, 1999

(30) Foreign Application Priority Data

May 9, 1998 (DE) .............................. 198 20 858

(51) Int. Cl.$^7$ .................. B32B 7/12; C09J 7/02
(52) U.S. Cl. ........... 428/343; 428/317.3; 428/317.7; 428/355 BL; 428/355 RA; 427/208; 248/205.3
(58) Field of Search ................ 428/343, 317.3, 428/355 RA, 355 BL, 317.7, 354; 427/208, 208.4, 208.6; 248/205.3

(56) References Cited

U.S. PATENT DOCUMENTS

| | | | |
|---|---|---|---|
| 4,024,312 | * | 5/1977 | Korpman ........................ 428/343 |
| 5,516,581 | * | 5/1996 | Kreckel et al. ................ 428/317.3 |
| 5,643,668 | * | 7/1997 | Calhoun et al. ................ 428/354 |
| 5,725,923 | | 3/1998 | Lühmann . |
| 5,759,679 | * | 6/1998 | Kitamura et al. ............ 428/317.3 |
| 5,897,949 | | 4/1999 | Lühmann et al. . |
| 5,921,514 | | 7/1999 | Schumann . |

FOREIGN PATENT DOCUMENTS

| | | |
|---|---|---|
| 43 39 604 | 5/1995 | (DE) . |
| 0 838 182 | 4/1998 | (EP) . |
| 0 845 514 | 6/1998 | (EP) . |
| 95 06691 | 3/1995 | (WO) . |

* cited by examiner

Primary Examiner—Daniel Zirker
(74) Attorney, Agent, or Firm—Norris McLaughlin & Marcus

(57) ABSTRACT

Adhesive tape for a bond which can be redetached without residue or damage by pulling, having a backing coated on one or both sides with a self-adhesive composition, characterized in that a) a self-adhesive composition whose ratio of tear strength to stripping force (peel strength) at a peel angle of less than 10° to the bond surface is greater than 1.2:1 is applied to at least one of the two sides of the backing, b) the backing has been subjected to controlled pretreatment/damaging in such a way that the detachment force (stripping force) is lower than that of a similar self-adhesive tape with a backing which has not been so pretreated/damaged, and c) the tear strength of the backing is insufficient for redetachment without residue or damage.

16 Claims, No Drawings

ADHESIVE TAPE

The invention relates to an adhesive tape for a bond which is redetachable without residue or damage by pulling, and to its use.

Highly extensible elastic adhesive films for bonds which are redetachable by pulling essentially in the direction of the bond plane are known and are commercially available under the name "tesa Power-Strips". Bonds produced with such films offer a powerful hold and yet can be redetached without leaving any trace and without damage to the substrate or adherends, as described in DE 33 31 016 C2. DE 42 22 849, DE 42 33 872, DE 44 28 587, DE 44 31 914, DE 195 11 288 and DE 197 08 366 describe, inter alia, specific embodiments and applications of aforesaid adhesive films.

Multilayer adhesive films comprising highly extensible film backings, either 15 elastic or of low elasticity, and applications of these adhesive films are likewise known from, for instance, U.S. Pat No. 4,024,312 "Pressure-sensitive adhesive tape for medical use—having an extensible, elastic block copolymer backing", WO 92/11332 "Removable adhesive tape" (PSA tape using highly extensible backing with photopolymerized acrylic PSA), WO 92/11333 (PSA tape using highly extensible essentially inelastic backing), WO 93/01979 "Securement of stacks using stretch adhesive tape" and WO 94/21157 "Article support using stretch releasing adhesive".

WO 92/11333, for instance, describes an adhesive tape which is redetachable by pulling in the bond plane and which as its backing makes use of a highly stretchable, essentially non-resilient (nonelastomeric) film having a resiliency of <about 50% after stretching. The combination of high extension and tear strength required for the detachment process is produced by the backing that is used. U.S. Pat. No. 4,024,312 describes correspondingly debonding self-adhesive tapes of an essentially elastomeric nature.

When selecting the backing films it is found in practice that they must meet very specific requirements. Films having a high Young's modulus and/or low maximum extensions, for instance, are unsuitable because adhesive films produced from them cannot be stretched with sufficient ease and/or force to enable them to be redetached from the substrates without residue or destruction by stretching essentially in the bond plane. In addition, very thick film backings cannot generally be used owing to the above restrictions.

In practice it is also found that high bond strengths can generally be achieved with the abovementioned self-adhesive tapes on smooth and firm substrates. On rough substrates the bond strength is inadequate for many applications, especially for thin self-adhesive tapes but even for those which are relatively thick. The probable cause of the inadequate bond strength is primarily an inadequate bonding area, caused in turn by deficient conformability of the adhesive tapes to rough and irregular surfaces, especially if two rough substrates are to be bonded to one another. For example, when bonding planar materials to coated woodchip wallpaper using tesa Power-Strips at service pressures (100 N/7.4 $cm^2$) the bonding areas achieved are often only about 10 to 40% of the area covered by the pressure-sensitive adhesive. Even when bonding to smooth planar surfaces, however, an inadequate bonding area may be the reason for inadequate bond strength. The cause is probably the inclusion of air bubbles in the bond areas. Such air bubbles are often impossible to eliminate completely, even by applying high pressures. In many cases bonds featuring such air inclusions will result in bond strengths markedly reduced in comparison to samples bonded over the whole area without air bubbles.

U.S. Pat. No. 5,516,581 and WO 95/06691 claim self-adhesive tapes which are redetachable by extension essentially in the bond plane and whose backings comprise polymeric foams. WO 95/06691 in particular describes how by using backing materials comprising polymer foams it is possible to obtain self-adhesive tapes redetachable by stretching which have markedly improved conformability to rough and irregular surfaces. As a consequence of the higher bonding area achieved by this means, high bond strengths can be realized with these products even on rough and irregularly formed substrates. The extension and tear strength necessary for the detachment process are brought about in all cases by way of the backing materials employed.

The primary determinants of the conformability of the desired self-adhesive tapes to rough and irregular surfaces and hence the achievable bond strength on corresponding substrates are the mechanical properties of the self-adhesive tape perpendicular to the bond plane (compressive strength, tensile stress/elongation behaviour, splitting resistance, surface finish, compression set, etc.) and the thickness of the self-adhesive tape, properties which are defined essentially by the profile of properties of the particular foam-based backing in precisely this preferential direction and by its thickness. The mechanical properties in the stretching direction, which critically influence the detachment process, and those perpendicular to the bond plane, which critically determine the conformability to rough and irregular substrates, however, cannot be controlled at will independently of one another with the prior art adhesive films. The detachment process requires, in particular, low stripping forces in order firstly to enable easy and pleasant detachment and secondly to ensure that detachment is free from destruction, even from highly sensitive substrates such as wallpapers, for example. Easy detachment is generally observed when the self-adhesive tapes combine high extension with very low yield stress.

The object of the present invention was to overcome the abovementioned drawbacks and, in particular, to obtain self-adhesive tapes which are redetachable without residue or destruction by stretching, especially in the bond plane, which permit graduated control of the detachment forces (stripping forces) by appropriate modification of the backings used, as a result of which a large number of commercially available film backings can be utilized in accordance with the invention and a large number of commercially available foams can be used, including a large number of foam-film laminates, which through the optional use of foam-based backings possess high conformability to rough and irregularly formed surfaces and so permit high bond strengths on such substrates, and where the foamless backings, foam-based backings and foam-film laminates used do not need to contribute to the tear strength that is required for detachment without residue or destruction by stretching essentially in the bond plane.

This object is achieved by adhesive tapes as are characterized in more detail in the claims, especially adhesive films which are redetachable without residue or destruction by stretching, especially in the bond plane, and which comprise foamless backings, foam-based backings or backings based on foam-film laminates, where such backings have been modified in a graduated manner by damage/pretreatment, such as cutting, perforation or punching, for example, as a result of which the forces required to stretch the aforesaid backings are controllable and lower than the stretching forces of backings which have not been so pretreated, with the consequence that resulting adhesive films which utilize the aforesaid backings possess reduced detachment forces and thus improved detachment characteristics;

the optional use of foam-based backings or foam-film laminates provides high conformability and hence bond strength on rough bond substrates.

The residueless and nondestructive redetachment of self-adhesive tapes of the invention is achieved by sufficiently high tear strength and elongation at break of the pressure-sensitive adhesive compositions utilized in combination with the aforesaid backings.

As a consequence of the possibility, described herein, of the graduated pretreatment of the backings (damaging) a very large selection is available of polymer films, foams and foam-film laminates for this application. By virtue of this possibility it is possible to produce self-adhesive tapes with a diverse application spectrum on the basis of inexpensive raw materials. By way of the nature of the pretreatment and the type and layer thickness of the pressure-sensitive adhesive compositions that are used it is possible in particular to control the detachment forces (stripping forces) of self-adhesive tapes of the invention within wide ranges. Since the detachment forces required for debonding by stretching is critically influenced by, inter alia, the force required to stretch the backings, the detachment forces for self-adhesive tapes of the invention are much lower, given the use of identical pressure-sensitive adhesive compositions and adhesive coating weights, than for those described in U.S. Pat No. 4,024,312, WO 92/11332, WO 92/11333, U.S. Pat. No. 5,516,581 and WO 95/06691, which represents an important advantage for the user.

In contradistinction to WO 92/11333, U.S. Pat. No. 5,516, 581 and WO 95/06691 it is possible in accordance with the invention to employ not only backings which in the unpretreated state are highly stretchable (maximum extension >about 250%), in which case stretching may be accompanied by essentially plastic deformation or by essentially elastic deformation, but also those of low stretchability (maximum extension <250%) in the unpretreated state. By virtue of this fact it is possible to select from a substantially broader base of films, foam-based backings and foam-film laminates. The abovementioned possibility exists because, owing to the pretreatment process, when the adhesive tape comprising the backings used in accordance with the invention is detached by stretching, the backings very largely separate into individual pieces and, in doing so, do not impair the stretching of the adhesive composition(s), and the high extension coupled with high tear strength required for the redetachment process is not imparted by the backing that is used.

Furthermore, backings described in U.S. Pat. No. 4,024, 312, WO 92/11332, WO 92/11333, U.S. Pat. No. 5,516,581 and WO 95/06691 must over their entire useful life possess the extensibility and high tear strength required for the process of detachment by stripping. If a reduction in one of the abovementioned parameters occurs as a result of ageing, then the residueless detachment process is jeopardized. The same does not apply to adhesive films of the invention, since in this case the residueless redetachment process is determined primarily by the profile of properties of the pressure-sensitive adhesive compositions used and not by the mechanical strength of the particular backing films in the direction in which these adhesive films can be separated by stretching.

When bonding onto rough and highly sensitive substrates, such as coated woodchip wallpaper, for example, it is found that self-adhesive tapes of the invention which utilize a foam-based backing or a foam-film laminate enable the load on the bond substrates to be substantially more uniform by virtue of the higher bonding area. Pretreatment of the backings by cutting, perforation or punching thereof considerably reduces the detachment forces in comparison with adhesive strips which utilize the similar but not correspondingly pretreated backings. This results in markedly fewer instances of destruction of the substrates on redetachment of the adhesive films—for instance, in the form of paint torn away—at the same time as a much greater load capacity of the bond in comparison with adhesive films which do not utilize foam-based backings.

Exemplary Applications

Residuelessly and nondestructively redetachable self-adhesive tapes for:

original closure applications, single and double sidedly adhesive.

the fixing of posters, pictures, calendars, postcards, signs, self-adhesive hooks, including preassembled systems, labels, for example price labels, generally, for joining materials which are to be debonded again at a later point in time.

damping elements, insulating elements, sealing elements.

Materials Employed

Pressure-sensitive Adhesive Compositions

The pressure-sensitive adhesive (PSA) compositions used are preferably those based on block copolymers comprising polymer blocks formed from vinylaromatic compounds (A blocks), preferably styrene, and those formed by polymerization of 1,3-dienes (D blocks), preferably butadiene and isoprene. Both homopolymer and copolymer blocks can be used in accordance with the invention. Resulting block copolymers may include identical or different D blocks, which can be hydrogenated partially, selectively or completely. Block copolymers can have a linear A-D-A structure. It is also possible to employ block copolymers of radial design, and star-shaped and linear multiblock copolymers. Further components present can be A-D diblock copolymers. Block copolymers can be modified, for example functionalized by reaction with maleic anhydride. Block copolymers of vinylaromatic compounds and isobutylene can likewise be employed in accordance with the invention. All of the abovementioned polymers can be used alone or in a mixture with one another. Typical use concentrations for the styrene block copolymers are in the range between 15 and 75% by weight, preferably in the range between 30 and 60% by weight and, with particular preference, in the range between 35 and 55% by weight.

Suitable tackifiers include rosin and its derivatives, aliphatic, aromatic-modified aliphatic, aromatic and phenol-modified tackifier resins, to name but a few. Use concentrations for the resins lie typically in the range between 15 and 75% by weight, preferably in the range between 30 and 65% by weight, and with particular preference, in the range between 35 and 60% by weight. When using rosin and its derivatives it is preferred to employ esters of partially or fully hydrogenated rosin.

As endblock-compatible resins (resins compatible primarily with the vinylaromatic blocks) it is possible to use homopolymers and copolymers of vinylaromatic compounds, such as styrene and α-methylstyrene, polyphenylene oxides, or phenylene oxide-modified resins.

Further optimum blend components include plasticizer oils and liquid resins (use concentrations between 0 and max. about 35% by weight), fillers (reinforcing and nonreinforcing), e.g. silica, especially synthetic silica, glass (ground or in the form of beads), aluminas, zinc oxides, calcium carbonates, titanium dioxides, and carbon blacks, to name but a few, anti-ageing agents (primary and secondary antioxidants, light stabilizers, antiozonants, metal deactivators, etc.). Further blend components include polymers which exert an effect, in particular, on the ozone resistance of block copolymers, such as polyvinyl acetates and ethylene-vinyl acetate copolymers.

Other copolymers which may be present are natural and synthetic polymers such as, for example, natural rubber, synthetic polyisoprenes, polybutadienes, polychloroprenes, SBR, Kraton liquid (Shell Chemicals), low molecular mass styrene-diene block copolymers, such as Kraton LVSI 101, polyisobutylenes, etc., which may replace up to about 50% by weight of the vinylaromatic-containing block copolymers.

PSA compositions used in accordance with the invention can be crosslinked chemically, especially by radiation-chemical means (for example by UV irradiation, γ irradiation or by irradiation with rapid electrons).

Adhesive compositions of the invention are optionally those whose pressure-sensitive adhesiveness comes about only through thermal or solvent activation.

Suitable PSA compositions include not only those described above based on block copolymers with a vinylaromatic content but also all those whose tear strength, cohesion and extension are sufficient for the detachment process. PSA compositions which meet this requirement can be employed alone or in combination with those based on block copolymers with a vinylaromatic content. Examples of suitable such compositions in accordance with the invention are PSA acrylate copolymers whose comonomers include macromonomers having a glass transition temperature of >+40° C. The high tear strength of such copolymers is probably due to the association of the macromonomers. Examples of suitable macromonomers are methacryloyl-terminated polymethyl methacrylates or methacryloyl-terminated polystyrenes.

Foamless Backings

Suitable polymer films include both those which permit high elastic or plastic deformation (elongations at break typically >about 250%) in the unpretreated state and those which permit only low plastic or elastic deformation (elongations at break typically <250%) in the unpretreated state. Film thicknesses are typically from about 10 to 500 $\mu$m, preferably from 15 to 300 $\mu$m and, with particular preference, from 20 to 150 $\mu$m. Polymer films which can be employed include those based on polyolefins, preferably polyethylene or polypropylene, those based on polystyrene or styrene copolymers, polyesters, polyamides, polyvinyl chloride, poly-urethanes and thermoplastic styrene block copolymers. The films may be employed in essentially unoriented (unstretched) form or else, for example, as mono-axially or biaxially oriented films. Films may also be of either single-layer or multilayer type.

Foam-based Backings

Foam-based backings of the invention (foam backings) are based in particular on ethylene homopolymers and copolymers, especially low and very low density polyethylenes (LDPE, LLDPE, VLDPE), ethylene-vinyl acetate copolymers, and mixtures of abovementioned polymers. Further possible polymers include: polyvinyl acetates, polypropylenes, polystyrenes, styrene copolymers, EPDM, thermoplastic elastomers based on styrene block copolymers, polyurethanes based on aromatic and aliphatic diisocyanates, PVC, polychloroprenes, natural rubber, and acrylate copolymers. The foam-based backings may be employed in crosslinked or uncrosslinked form. The foams employed may be either those which exhibit extensive elastic deformation or those which exhibit extensive plastic deformation. In accordance with the invention it is likewise possible to utilize mixtures of abovementioned materials and also blends thereof with further components, such as natural rubber/resin mixtures or synthetic rubber/resin mixtures, for example.

The thicknesses of the foam-based backings employed are in particular between 150 $\mu$m and 30 mm, preferably between 200 $\mu$m and 7 mm. Densities are from 20 to 600 kg/m$^3$, preferably from 30 to 300 kg/m$^3$. The foam structure may be either one of closed cells, open cells or mixed open/closed cells. The foam utilized may or may not have a skin. In accordance with the invention it is likewise possible to employ multilayer product structures consisting of foamed layers and unfoamed layers. For instance, it is possible in accordance with the invention to employ foam/film coextrudates, in which foamed layers and unfoamed, coextruded layers may consist of the same or different materials. Also possible for use in accordance with the invention are laminates of two or more foam-based backings with or without polymer films. Foam-based backings which comprise foam-polymer film laminates may be of a construction wherein the foam layer is provided on one or both sides with a polymer film layer. If the foam-based backing consists of two or more foam-comprising layers, then each layer may optionally be laminated on one or both sides to a polymer film. Sufficient laminate strength between polymer film(s) and foam layer(s) can be realized, inter alia, by coextrusion, flame lamination or hot lamination, the use of laminating adhesives, the use of sealing layers, by means of priming, pressure pretreatment (e.g. by means of corona or plasma discharge, by means of plasma deposition, gas fluorination or liquid fluorination, etc.), etc. Laminating adhesives can be employed in the form of their aqueous dispersions, as solutions in organic solvents, or in PSA or non-PSA hotmelt form.

Suitable polymer films for foam-polymer film laminates include both those which permit high elastic or plastic deformation (elongations at break typically >about 250%) in the unpretreated state and those which permit only low plastic or elastic deformation (elongations at break typically <250%) in the unpretreated state. Film thicknesses and the thicknesses of unfoamed coextrusion layers are typically from about 5 to 300 $\mu$m, preferably from 10 to 200 $\mu$m and, with particular preference, from 15 to 100 $\mu$m. Polymer films which can be employed include those based on polyolefins, preferably polyethylene or polypropylene, those based on polystyrene or styrene copolymers, polyesters, polyamides, polyvinyl chloride, polyurethanes and thermoplastic styrene block copolymers or mixtures of abovementioned polymers. The films may be employed in essentially unoriented (unstretched) form or else, for example, as mono-axially or biaxially oriented films. In principle it is likewise possible to use polymer- and cellulose-based nonwovens, papers and wovens.

Pretreating the Backings

To adjust the stripping forces the foamless backings, foam-based backings or foam-film laminates of self-adhesive tapes of the invention are subjected to pretreatment/damage by means, for example, of perforation, cutting or punching. Such pretreatment can be carried out before or after the first coating with PSA composition. Pretreatment results, in particular, in incisions in the backing or areas where material has been removed from the backing, so reducing the mechanical strength of the backing in the direction in which, subsequently, the self-adhesive tapes produced using said backings are to be detached by stretching essentially in the bond plane.

Examples of such pretreatments are cuts, punchings and perforations. They may cover the entire area of the backings or may be limited to certain areas. They may have a regular structure, follow a repeat pattern, or be irregular. Where the backing consists of two or more layers and/or components, they may be pretreated individually or selectively. In the case, for example, of a laminate consisting of a foamed layer and a film layer, it is possible to pretreat just the film by means of cuts, punchings or perforations. Multilayer foam-based carriers in which the unpretreated foamed layer typically tears in the course of the detachment process can be pretreated selectively only in the layers which typically do not tear without pretreatment in the course of the detachment process.

A distinction can be made between pretreatments where the original form of the backing materials is retained and those in which as a result of removal of material (punching out, for example) or thermal treatment (melting, for example) areas free of material are produced in the backing, in the form, for instance, of perforation-like or channel-like openings. Incisions and areas free of material may penetrate the backing fully or just partly, or else may both be present, in hybrid form. They can be made in one or both sides of the backing.

The abovementioned areas free of material can be utilized in the production process by being filled, in the end product, with PSA composition, so that in the case of double-faced PSA-coated adhesive films and areas which are free of material and which penetrate the backing there is a continuous connection of the two PSA layers. One of the effects of the resulting interlock is to enhance the integrity of such adhesive films in the course of the detachment process.

Anchoring the Pressure-sensitive Adhesive Compositions to the Backings

To produce sufficient anchorage of the PSA compositions used on the backings the latter are advantageously subjected to a pressure pretreatment in the course of their production and/or prior to their coating. Suitable pretreatment techniques include fluorine pretreatment, corona pretreatment, plasma treatment and flame pretreatment, the latter in particular by means of an electrically polarized flame. Pretreatment methods may be applied individually or in combination. In the case of film backings, skinned foams, integral foams and foam-polymer film laminates, anchorage of the adhesive composition may be improved further by carrying out priming of the foam-based backing.

Open-cell and mixed-cell foams can be subjected to impregnation. A barrier layer may optionally be integrated between foam-based backing and PSA compositions in order to reduce the migration of migratable materials between PSA compositions and backing.

Self-adhesive Tapes

Self-adhesive tapes of the invention comprise at least one backing treated on one or both sides with a pressure-sensitive adhesive composition. The elongation at break and tear strength of the adhesive composition is such that corresponding self-adhesive tapes can be detached again from the bond substrates without residue or destruction by stretching, in particular, in the bond plane. PSA compositions may be of identical or different formulation, may cover all of the backing or part of it—applied in stripes, for instance—and may be applied with the same or different coating weight to both sides of the adhesive tape. Adhesive compositions may be composed of one or more layers of adhesive composition. For example, an adhesive layer may consist of two plies both of which have as their polymer basis block copolymers with a vinylaromatic content, the block copolymers being identical or different in type. Alternatively, a first adhesive layer comprising block copolymers with a vinylaromatic content may have applied to it one based on other rubbers, such as natural rubber or polybutadiene or polyisobutylene or "Kraton liquid" (Shell Chemicals), or mixtures of the abovementioned polymers.

Self-adhesive tapes are characterized in that their elongations at break are in particular greater than 200%, preferably greater than 350% and, with particular preference, greater than 450%.

Tear strengths of the PSA compositions used are greater than 1.5 MPa, preferably greater than 3 MPa and, with particular preference, greater than 5 MPa.

Layer thicknesses of the PSA compositions which determine the tear strength are in particular $\geq$ about 60 $\mu$m, preferably $\geq$ 100 $\mu$m and, with particular preference, $\geq$ 160 $\mu$m.

The ratio of tear strength to stripping force of the self-adhesive tapes at peel angles of <10° to the bond surface is greater than 1.2:1, preferably greater than 1.5:1 and, with particular preference, greater than 2:1.

Fabrication Form

Fabrication forms of adhesive tapes of the invention embrace both rolls of adhesive tape and adhesive-tape sections of defined dimensions in the form, for example, of punched products. Adhesive-tape sections of defined dimensions may optionally have a shaped end in accordance with DE 44 28 587—an end tapering to a point, for example—or may in accordance with DE 44 31 914 be furnished with a release-coated grip-tab film or release-coated release paper. Likewise possible is the production of a grip-tab region by rendering the PSA surface inert with the aid, for example, of a non-PSA coating material or by powdering with a non-PSA material.

Production

Adhesive films of the invention are obtained by coating the above-described polymer films, foam-based backings or foam-film laminates with the desired adhesives. Adhesives can be coated in the form of their solutions in an organic solvent, in the form of their aqueous dispersions, or as 100% systems. Preference is given to the use of hot melt PSAs, which are applied to the backing directly or by cold or hot lamination.

The subjection of the polymer films, foam-based backings or foam-film laminates to perforation, cutting or punching, for example, can be performed by means of the customary techniques known to persons skilled in the art: for example, mechanically by cutting using a blade, by using a rotary punch or by using perforation knives, or thermally, by laser perforation, for example. Such treatment may be carried out either on the uncoated backing or on the material which is being coated on one side with pressure-sensitive adhesive composition.

Test Methods

Tip-shear Strength (holding power)

To determine the tip-shear strength the test adhesive film measuring 20 mm×50 mm and provided at one end at both sides with a nonadhesive grip-tab region (obtained by laminating on a piece of 25 $\mu$m thick biaxially oriented polyester film measuring 20 mm×13 mm (Hostaphan RN 25)) is bonded centrally to a square steel plate, polished to a high lustre, measuring 40 mm×40 mm×3 mm (length×width× thickness). On the reverse the steel plate carries centrally a 10 cm steel pin which sits vertically on the plate surface. The resulting specimens are bonded to the test substrate with a force of 100 N (press-on time=5 sec) and left in the unloaded state for 5 minutes. After the selected tip-shear load has been applied by attaching a suspended weight (lever arm and mass of the weight are variable) the time to bond failure is measured.

Stripping Force (detachment force)

To determine the stripping force an adhesive film measuring 50 mm×20 mm (length×width) with a nonadhesive grip-tab region (see above) at its top end is bonded between two steel plates (arranged in precise congruence) measuring 50 mm×30 mm in accordance with the procedure described above under "tip-shear strength" but with press-on pressures of 500 N in each case. The bottom end of each steel plate carries a bore intended to receive an S-shaped steel hook. The bottom end of the steel hook carries a further steel plate by way of which the test setup can be fixed for measurement in the lower jaw of a tensile tester. The bonded assemblies are stored at +40° C. for 24 h. After reconditioning to RT the adhesive film strip is removed at a peel rate of 1000 mm/min parallel to the bond plane. During this procedure the required stripping force is measured in N/cm. Finally, the steel plates are examined for residues of adhesive composition.

Bonding Area on Glass

Adhesive film strips measuring 20 mm×50 mm are bonded centrally to a planar steel substrate measuring 200 mm×100 mm. The assembly produced in this way is bonded vertically and congruently to a glass plate of the same dimensions and is pressed on centrally under a uniform pressure of 100 N. The press-on time is 5 seconds. Determination is made in triplicate. The bonding area obtained on the glass surface is determined visually and expressed as a percentage of the surface area of the adhesive film.

Bonding Area on Woodchip Wallpaper

In order to determine the bonding area on rough substrates, adhesive film strips measuring 20 mm×50 mm are bonded centrally to a planar steel substrate measuring 200 mm×100 mm. The assembly produced in this way is placed vertically and congruently on a piece of painted woodchip wallpaper (wallpaper: Erfurt Körnung 52; paint: Herbol Zenit LG; wallpaper bonded to chipboard) of the same dimensions, which has been given a thin powdering of aluminium bronze, and is pressed on centrally under a uniform pressure of 100 N. The press-on time is 5 seconds. Determination is made in triplicate. Samples can easily be lifted vertically from the powdered woodchip wallpaper. The bonding area obtained is determined visually, by way of the aluminium bronze transferred to the adhesive-film surface, and expressed as a percentage of the surface area of the adhesive film.

Testing for Residueless and Nondestructive Redetachment

A test to this effect is conducted at the same time as the stripping force is determined (see above) for the substrates steel//steel. To determine the residueless and nondestructive redetachability on other substrates as well, such as PMMA// painted woodchip wallpaper (wallpaper: Erfurt Körnung 52; paint: Herbol Zenit LG; wallpaper bonded to chipboard) corresponding test specimens, as described above under "stripping force (detachment force)", are produced and the bond is parted (stripped) either mechanically or manually. An evaluation is made as to whether residues of adhesive composition are present on the bond substrates or, respectively, whether instances of destruction of the bond substrates can be detected.

EXAMPLES

Examples 1 to 13

Alveolit TA 0501.5 and Alveolit TE 0500.8 (Alveo AG) are subjected in the lengthwise web direction to perforation punching to produce, at crosswise intervals of 2 mm, incisions 8 mm long which pass through the entire foam-based backing and are interrupted by 3 mm long regions without punching. Adjacent punch cuts are offset by 5.5 mm relative to one another, so that alternate punch cuts are congruent. A pressure-sensitive adhesive (PSA) composition consisting of 20 parts of SBS block copolymer (Vector 8508, Exxon), 80 parts of SIS block copolymer (Vector 4211, Exxon), 100 parts of a penta ester of partially hydrogenated rosin (Foralyn 110, Hercules) and 1 part of a primary antioxidant (Irganox 1010, Ciba Geigy) [=formulation 1] is applied to both sides of the appropriate foams by cold lamination. For this purpose the perforated foam is laid on the pressure-sensitive adhesive (width of foam and adhesive in each case 50 mm), which is on siliconized release paper, and the assembly is then rolled five times with a pressing force of 50 N using a rubber-coated steel roller 250 mm wide. The semi-finished product obtained in this way is coated identically with PSA on the second side.

The foam-polymer film laminates listed below are processed analogously to give adhesive films:

| Ser. No. | Commercial name: foam | Commercial name: film | Film thickness | Film-manufacturer |
|---|---|---|---|---|
| FV-1 | Alveolit TE 0500.8 | Trespaphan FND 30 | 30 μm | Hoechst |
| FV-2 | Alveolit TE 0500.8 | 40 MB 250 | 40 μm | Mobil Plastics |
| FV-3 | Alveolit TE 0500.8 | Hostaphan RN 25 | 25 μm | Hoechst |
| FV-4 | Alveolit TE 0500.8 | Plastotrans LDPE | 60 μm | 4P-Forchheim |

| Ser. No. | Laminating adhesive// coating weight | Film laminated on one or both sides to foam | Overall thickness of carrier (approximate) |
|---|---|---|---|
| FV-1 | Formulation 2//40 g/m² | both sides | 950 μm |
| FV-2 | Formulation 2//40 g/m² | one side | 890 um |
| FV-3 | Formulation 2//40 g/m² | both sides | 930 μm |
| FV-4 | Formulation 2//40 g/m² | one side | 880 μm |

In a first manufacturing step the abovementioned polymer films are coated on one side with about 40 g/m² of a hot melt adhesive consisting of 50 parts of Vector 4461 (Dexco), 50 parts of Foralyn 110 (Hercules) and 1 part of Irganox 1010 (Ciba) [=formulation 2], then laminated in a hot roll laminator (roll diameter: 60 mm; roll temperature: +80° C.; roll speed: 400 mm/min) in a width of 100 mm onto one side and both sides, respectively, on Alveolit TA 0501.5 and Alveolit TE 0500.8 with a pressing force of 200 N. Samples produced in this way are subsequently first subjected to perforation punching to a procedure similar to that described above and then processed further to double-sided pressure-sensitive adhesive films.

Tests are conducted after the resultant samples have been conditioned for 24 hours in a climatically controlled chamber (50±5% relative humidity, T=RT=23±1° C.). Test specimens (adhesive films) are in all cases (with their longer side) punched out transversely to the direction of perforation of the foam backing used.

For comparison, the adhesive films without a foam-based carrier are investigated. The following properties are found:

| Example No. | Sample designation | Foam or foam-film laminate | Type of foam | Manufacturer |
|---|---|---|---|---|
| 1 | 3.014 | Alveolit TA 0501.5 | PE crosslinked | Alveo AG |
| 2 | 3.014A | Alveolit TA 0501.5 | PE crosslinked | Alveo AG |
| 3 | 3.017 | Alveolit TE 0500.8 | EVAc crosslinked | Alveo AG |
| 4 | 3.017A | Alveolit TE 0500.8 | EVAc crosslinked | Alveo AG |
| 5 | 3.017-981 | Alveolit TE 0500.8 // Trespaphan FND 30 | = FV-1 | — |
| 6 | 3.017-982 | Alveolit TE 0500.8 // Trespaphan FND 30 | = FV-1 | — |
| 7 | 3.017-983 | Alveolit TE 0500.8 // 40 MB 250 | = FV-2 | — |
| 8 | 3.017-984 | Alveolit TE 0500.8 // Hostaphan RN 25 | = FV-3 | — |
| 9 | 3.017-985 | Alveolit TE 0500.8 // Hostaphan RN 25 | = FV-3 | — |
| 10 | 3.017-986 | Alveolit TE 0500.8 // Plastotrans LDPE | = FV-4 | — |
| 11 | 3.000A | — | — | — |
| 12 | 3.000B | — | — | — |
| 13 | 3.000.988 | Foamless backing Hostaphan RN 25 | — | — |

| Example No. | Sample designation | Backing thickness in $\mu$m | Foam density in $kg/m^3$ | Adhesive coating weight sides A // B | Adhesive formulation |
|---|---|---|---|---|---|
| 1 | 3.014 | 1500 | 200 | 200 // 200 $g/m^2$ | [1] |
| 2 | 3.014A | 1500 | 200 | 200 // 200 $g/m^2$ | [1] |
| 3 | 3.017 | 800 | 200 | 200 // 200 $g/m^2$ | [1] |
| 4 | 3.017A | 800 | 200 | 200 // 200 $g/m^2$ | [1] |
| 5 | 3.017-981 | 950 | $200^1$ | 210 // 210 $g/m^2$ | [1] |
| 6 | 3.017-982 | 950 | $200^1$ | 210 // 210 $g/m^2$ | [1] |
| 7 | 3.017-983 | 890 | $200^1$ | 210 // 210 $g/m^2$ | [1] |
| 8 | 3.017-984 | 930 | $200^1$ | 210 // 210 $g/m^2$ | [1] |
| 9 | 3.017-985 | 930 | $200^1$ | 210 // 210 $g/m^2$ | [1] |
| 10 | 3.017-986 | 880 | $200^1$ | 210 // 210 $g/m^2$ | [1] |
| 11 | 3.000A | — | — | 360 $g/m^2$ | [1] |
| 12 | 3.000B | — | — | 650 $g/m^2$ | [1] |
| 13 | 3.000-988 | 25 | — | 210 // 210 $g/m^2$ | [1] |

[1]Density of Alveolit TE 0500.8

| Example No. | Sample designation | Stripping force | Bonding area in % on woodchip // on glass | | Tip-shear strength*** |
|---|---|---|---|---|---|
| 1 | 3.014 | 20–30 N/cm | about 80% | >95% | 30 days |
| 2 | 3.014A | 8.7 N/cm | about 80% | >95% | 33 days |
| 3 | 3.017 | 26 N/cm | about 80% | >95% | 28 days |
| 4 | 3.017A | 14 N/cm | about 80% | >95% | 26 days |
| 5 | 3.107-981 | 16 N/cm | about 80% | >95% | 53 days |
| 6 | 3.107-982 | not strippable because backing is not perforated | | | |
| 7 | 3.107-983 | 15 N/cm | about 80%2 | >95% | 43 days |
| 8 | 3.107-984 | 16 N/cm | about 80% | >95% | 56 days |
| 9 | 3.107-985 | not strippable because backing is not perforated | | | |
| 10 | 3.107-986 | 18 N/cm | about 80%2 | >95% | 47 days |
| 11 | 3.000A | 8 N/cm | about 30% | 40–50%**** | 4–6 days |
| 12 | 3.000B | 11 N/cm | about 40% | 60–70%**** | 8–12 days***** |
| 13 | 3.000-988 | 9.3 N/cm | about 30% | 40–50%**** | |

[2]Side of foam not laminated with film faces the woodchip wallpaper
*Bond substrates = steel // steel and coated woodchip // PMMA
**Foam-based backing perforated as described above; foam-based backing is irreversibly deformed on stretching
***Lever arm = 50 mm; shear load = 5 N; substrate = coated woodchip wallpaper
****Extensive air inclusions
*****Woodchip wallpaper splits in the bonded area

| Example No. | Sample designation | Does foam or foam-film laminate tear on detachment? | Can adhesive film be stripped without residue or destruction?* | Is foam perforated? |
| --- | --- | --- | --- | --- |
| 1 | 3.014 | yes | yes | no |
| 2 | 3.014A | ** | yes | yes** |
| 3 | 3.107 | no | yes | no |
| 4 | 3.017A | ** | yes | yes** |
| 5 | 3.017-981 | ** | yes | yes** |
| 6 | 3.017-982 | no | no | no |
| 7 | 3.017-983 | ** | yes | yes** |
| 8 | 3.017-984 | ** | yes | yes** |
| 9 | 3.017-985 | no | no | no |
| 10 | 3.017-986 | ** | yes | yes** |
| 11 | 3.000A | — | yes | — |
| 12 | 3.000B | — | yes | — |
| 13 | 3.000-988 | (foamless backing) | yes | yes (foamless backing) |

*Bond substrates = steel // steel and coated woodchip // PMMA
**Foam-based backing perforated asdescribed above; foam-based backing is irreversibly deformed on stretching
***Lever arm = 50 mm; shear load = 5 N; substrate = coated woodchip wallpaper
****Extensive air inclusions
*****Woodchip wallpaper splits in the bonded area The pretreatment performed on the foam backings achieves a marked reduction in the detachment forces (stripping forces) in all cases.

This does not impair the residueless and nondestructive detachment characteristics. At the same time, the perforation which has been carried out does not affect the achievable bonding area nor the bond strengths which can be achieved. In all cases, in comparison with the adhesive films which do not utilize foam-based backings, substantially higher bonding areas and bond strengths are found.

By means of the perforation punching it is possible at the same time to utilize foam-film laminates and foamless backings which in the unperforated state, owing to their low stretchability or the high stretching force required for the film used, cannot be employed for strippable self-adhesive tapes.

What is claimed is:

1. Adhesive tape for a bond which can be redetached without residue or damage by pulling, having a backing coated on one or both sides with a self-adhesive composition, characterized in that
   a) a self-adhesive composition whose ratio of tear strength to stripping force (peel strength) at a peel angle of less than 10° to the bond surface is greater than 1.2:1 is applied to at least one of the two sides of the backing,
   b) the backing has been subjected to controlled pretreatment/damaging in such a way that the detachment force (stripping force) is lower than that of a similar self-adhesive tape with a backing which has not been so pretreated/damaged, and
   c) the tear strength of the backing is insufficient for redetachment without residue or damage.

2. Adhesive tape according to claim 1, wherein the backing is a single-layer or multilayer backing with at least one unfoamed layer.

3. Adhesive tape according to claim 1, wherein the backing is coated on both sides with self-adhesive composition.

4. Adhesive tape according to claim 1, wherein the backing has a multilayer structure.

5. Adhesive tape according to claim 4, wherein at least one layer of the multilayer backing is a foamed layer.

6. Adhesive tape according to claim 1, wherein the self-adhesive composition is based on block copolymers.

7. Adhesive tape according to claim 6, wherein the self-adhesive composition is based on block copolymers comprising polymer blocks of vinylaromatic compounds (A blocks) and blocks formed by polymerization of 1,3-dienes (D blocks).

8. Adhesive tape according to claim 6, wherein the self-adhesive composition comprises tackifiers.

9. Adhesive tape according to claim 6, wherein the pretreatment/damaging of the backing is carried out by means selected from full cuts, partial cuts, perforation or punching.

10. Adhesive according to claim 6, wherein the damage sites penetrate the backing in part or fully.

11. Adhesive tape according to claim 6, which it is in the form of sections, one end of the section having a non-tacky grip tab and the other end, optionally, having an adhesive area which decreases towards the end.

12. Adhesive tape according to claim 6, which comprises a grip tab formed by film sections, applied by lamination, whose sides in contact with the self-adhesive composition have been given an anti-adhesive finish.

13. Method according to claim 1, wherein the section is coated on both sides with self-adhesive composition and is used together with a hook, a baseplate or an article which is to be suspended, and, optionally, the section is preassembled on such articles.

14. A method of forming an adhesive bond on a surface, and thereafter releasing said bond without leaving a residue on said surface, and without damaging said surface, said method comprising:
   a) providing a section of an adhesive tape according to any one of claims 1–12;
   b) applying said section to said surface to form said bond; and
   c) pulling on one end of said section to release said bond from said surface without leaving a residue on said surface, and without damaging said surface.

15. Adhesive tape according to claim 2, wherein the unfoamed layer is a film backing.

16. Adhesive tape according to claim 6, wherein the block copolymers comprise vinylaromatic blocks.

* * * * *

UNITED STATES PATENT AND TRADEMARK OFFICE
CERTIFICATE OF CORRECTION

PATENT NO. : 6,280,840 B1
DATED : August 28, 2001
INVENTOR(S) : Luhmann et al.

It is certified that error appears in the above-identified patent and that said Letters Patent is hereby corrected as shown below:

Column 14,
Line 37, "which it is in the" should read -- which is in the --

Signed and Sealed this

Twenty-first Day of December, 2004

JON W. DUDAS
*Director of the United States Patent and Trademark Office*